(12) United States Patent
Johnson et al.

(10) Patent No.: US 6,957,020 B2
(45) Date of Patent: Oct. 18, 2005

(54) OPTICAL INTER-SATELLITE LINK (OISL) GIMBAL

(75) Inventors: Dan R. Johnson, Los Angeles, CA (US); Mark A. Carroll, Newport Beach, CA (US); Daniel R. Sherman, Gardena, CA (US); Timothy R. Stone, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 248 days.

(21) Appl. No.: 10/367,069

(22) Filed: Feb. 14, 2003

(65) Prior Publication Data

US 2004/0179847 A1 Sep. 16, 2004

Related U.S. Application Data

(63) Continuation of application No. 09/346,052, filed on Jul. 7, 1999, now abandoned.

(51) Int. Cl.[7] .............................................. G02B 26/10
(52) U.S. Cl. ........................ 398/122; 398/118; 398/121
(58) Field of Search ................................ 398/121, 122, 398/130, 131, 135, 140, 156, 118

(56) References Cited

U.S. PATENT DOCUMENTS

| 3,504,182 A | 3/1970 | Pizzurro et al. |
| 3,511,998 A | 5/1970 | Smokler |
| 4,017,146 A | 4/1977 | Lichtman ........................ 350/7 |
| 4,621,893 A * | 11/1986 | Lohmann .................... 359/200 |
| 4,715,694 A * | 12/1987 | Eitel .......................... 350/486 |
| 4,755,731 A * | 7/1988 | Anthony et al. ............. 318/662 |
| 4,982,445 A | 1/1991 | Grant et al. ................ 350/142 |
| 5,060,304 A | 10/1991 | Solinsky ..................... 356/152 |
| 5,062,150 A | 10/1991 | Swanson et al. ......... 250/203.1 |
| 5,110,195 A | 5/1992 | Loney |
| 5,282,073 A | 1/1994 | Defour et al. .............. 356/152 |
| 5,390,040 A * | 2/1995 | Mayeux ...................... 250/234 |
| 5,475,520 A | 12/1995 | Wissinger .................. 455/12.1 |
| 5,486,690 A | 1/1996 | Ake .......................... 356/3.16 |

(Continued)

FOREIGN PATENT DOCUMENTS

EP 0482472 A2 10/1991

(Continued)

*Primary Examiner*—Brent A. Swarthout
(74) *Attorney, Agent, or Firm*—Noel F. Heal

(57) ABSTRACT

An optical inter-satellite link (OISL) gimbal 10 that is particularly suited for directing an optical beam in an optical inter-satellite communications system is disclosed. The OISL gimbal 10 includes an azimuth drive housing 20, a generally cylindrical azimuth shaft 22 rotatably connected to the azimuth drive housing 20 and an optical payload 210 or beam-steering mirror 70 rotatably connected to the azimuth shaft 22. The azimuth shaft 22 has a clear aperture through which one or more optical beams may be directed to and from a stationary optical payload 30. A capacitive azimuth position sensor 40 detects the rotational position of the azimuth shaft 22 and a direct drive azimuth motor 50 drives rotation of the azimuth shaft 22. The OISL gimbal 10 preferably provides two-axis rotation of the optical payload 210 or beam-steering mirror 70 through approximately +/−180 degrees of inboard (azimuth) travel and +/−30 degrees of line-of-sight outboard (elevation) travel. Rotation of the optical payload 210 or beam-steering mirror 70 about the elevation axis may be driven by a direct-drive elevation motor 160. Also, a capacitive elevation position sensor 130 may be provided for detecting the rotational position of the optical payload or beam-steering mirror about the elevation axis.

8 Claims, 3 Drawing Sheets

U.S. PATENT DOCUMENTS

| | | | |
|---|---|---|---|
| 5,592,320 A | | 1/1997 | Wissinger |
| 5,654,549 A | * | 8/1997 | Landecker et al. .......... 250/332 |
| 5,710,652 A | | 1/1998 | Bloom et al. |
| 5,751,078 A | | 5/1998 | Loewenthal ................. 310/36 |
| 5,838,278 A | * | 11/1998 | Tsujisawa et al. .......... 342/377 |
| 5,867,294 A | * | 2/1999 | Sakai |
| 5,897,223 A | | 4/1999 | Tritchew et al. ............... 396/13 |
| 6,037,737 A | | 3/2000 | Bupp et al. ................. 318/610 |
| 6,138,261 A | | 10/2000 | Wilcoxson et al. ......... 714/755 |
| 6,158,694 A | * | 12/2000 | Gowrinathan ............... 244/171 |
| 6,202,189 B1 | | 3/2001 | Hinedi et al. ............... 714/786 |
| 6,268,944 B1 | * | 7/2001 | Szapiel |
| 6,279,132 B1 | | 8/2001 | Linsky et al. ................ 714/755 |
| 6,374,382 B1 | | 4/2002 | Solomon et al. ............. 714/755 |

FOREIGN PATENT DOCUMENTS

| | | |
|---|---|---|
| EP | 0504022 A1 | 3/1992 |
| EP | 0643493 | 3/1995 |
| EP | 0847149 A1 | 8/1997 |
| EP | 0863627 A1 | 10/1997 |
| EP | 0876013 A1 | 12/1997 |
| EP | 0883253 A1 | 6/1998 |
| EP | 0887656 A1 | 9/1998 |
| EP | 0991219 | 4/2000 |

* cited by examiner

OPTICAL INTER-SATELLITE LINK (OISL) GIMBAL

This application is a continuation of application Ser. No. 09/346,052, filed Jul. 7, 1999, now abandoned.

BACKGROUND OF THE INVENTION

The present invention relates generally to the field of optical communications. More specifically, the present invention relates to a two-axis gimbal assembly for a coarse steering mirror, which is used in an optical inter-satellite communications system.

Weight, volumetric displacement and power consumption are critical parameters when designing for satellite-based communications equipment. Higher weight, volumetric displacement and power consumption may lead to higher spacecraft and launch costs and/or reduced payload capacity. Satellite-based communications equipment must also be thermally stable, reliable and durable due to the harsh space environment in which it operates and the obvious problem that it will be inaccessible for servicing.

Optical inter-satellite communications systems require steering mechanisms that must provide a large articulation range on two axes (azimuth and elevation) and, at the same time, reasonable accuracy and stability. For example, accuracy to less than 1 milliradian may be required for certain functions.

BRIEF SUMMARY OF THE INVENTION

It is an object of the preferred embodiment of the present invention to provide a gimbal assembly for directing a light beam in an optical inter-satellite communications system.

It is a further object of the preferred embodiment of the present invention to provide a gimbal assembly that has a small volumetric displacement.

It is a further object of the preferred embodiment of the present invention to provide a gimbal assembly that is low weight.

It is another object of the preferred embodiment of the present invention to provide a gimbal assembly that is power efficient.

It is another object of the preferred embodiment of the present invention to provide a gimbal assembly that is reliable and durable.

It is still another object of the preferred embodiment of the present invention to provide a gimbal assembly that is accurate, stable and capable of directing a light beam over a large articulation range in two axes.

These and other objects of the present invention are provided by an optical inter-satellite link (OISL) gimbal for steering a light beam in an optical inter-satellite communications system. The OISL gimbal is particularly suited for directing an optical beam in an optical inter-satellite communications system. The OISL gimbal includes an azimuth drive housing, a generally cylindrical azimuth shaft rotatably connected to the azimuth drive housing and an optical payload or beam-steering mirror rotatably connected to the azimuth shaft. The azimuth shaft has a clear aperture through which one or more optical beams may be directed to and from a stationary optical payload. An azimuth position sensor detects the rotational position of the azimuth shaft and a direct drive azimuth motor drives rotation of the azimuth shaft.

The OISL gimbal preferably provides two-axis rotation of the optical payload or beam-steering mirror through approximately +/−180 degrees of inboard (azimuth) travel and +/−30 degrees of line-of-sight outboard (elevation) travel.

Rotation of the optical payload or beam-steering mirror about the elevation axis may be driven by a direct-drive elevation motor. Also, an elevation position sensor may be provided for detecting the rotational position of the optical payload or beam-steering mirror about the elevation axis. The azimuth position sensor and elevation position sensor may comprise capacitive position sensors.

Other objects, features, and advantages of the present invention will be apparent from the accompanying drawings and from the detailed description that follows below.

DETAILED DESCRIPTION OF THE INVENTION

Figure 1:
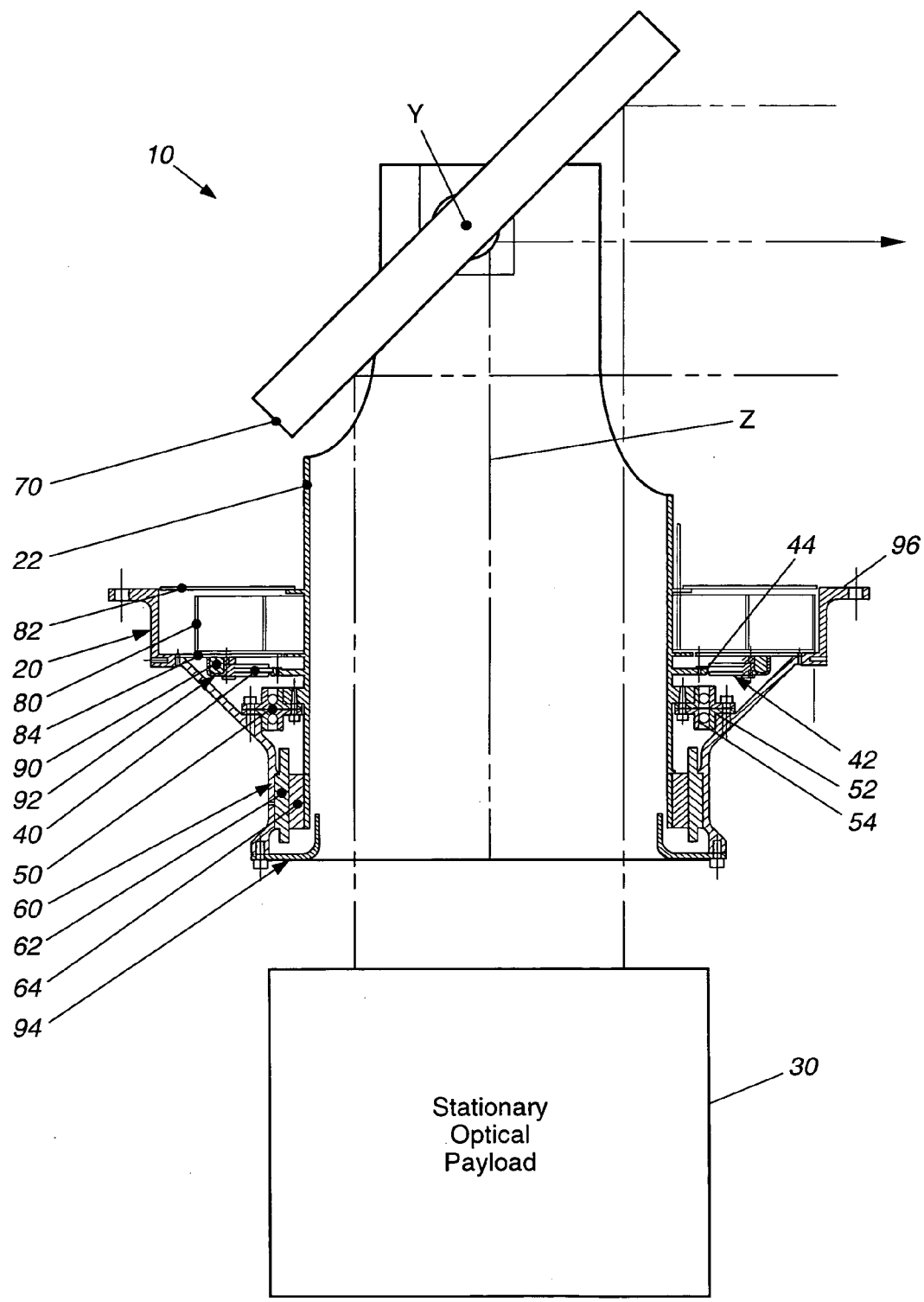
FIG. 1 illustrates a side cross sectional view of an optical inter-satellite link (OISL) gimbal according to a preferred embodiment of the present invention.

An OISL gimbal 10 according to a preferred embodiment of the present invention is illustrated in FIG. 1. The OISL gimbal 10 is particularly suited for directing a light beam in an optical inter-satellite communications system to within one milli-radian of uncertainty. The OISL gimbal 10 includes an azimuth drive housing 20 that may be mounted in a fixed position on the outer surface of a spacecraft or satellite. An azimuth shaft 22 is rotatably connected to the azimuth drive housing 20. The azimuth shaft 22, which is generally cylindrical in shape with an open lower end and an open, tapered upper end, creates a large clear aperture through which one or more optical beams may be directed to and from a stationary optical payload 30. An azimuth position sensor 40 detects the rotational position of the azimuth shaft 22 with respect to the azimuth drive housing 20. The azimuth position sensor 40 includes an azimuth sensor stator 42 that is fixed with respect to the azimuth drive housing 20 and an azimuth sensor rotor 44 that rotates with the azimuth shaft 22. The azimuth shaft 22 rotates on a duplex ball bearing 50. The duplex ball bearing 50 includes a stationary outer race 52 that is fixed to the azimuth drive housing 20 and a rotating inner race 54 that is fixed to the azimuth shaft 22. An azimuth motor 60, comprising an azimuth motor stator 62 connected to the azimuth drive housing 20 and an azimuth motor rotor 64 connected to the azimuth shaft 20, drives rotation of the azimuth shaft 22. A beam-steering mirror 70 is connected to the azimuth shaft 22 and rotates with the azimuth shaft 22 about the azimuth axis (indicated at Z). The beam-steering mirror 70 is mounted to the azimuth shaft 22 in a manner (more fully described herein) that provides rotation of the beam-steering mirror 70 about the elevation axis (into the page, indicated at Y). This arrangement preferably provides two-axis rotation of the beam-steering mirror 70 through approximately +/−180 degrees of inboard (azimuth) travel +/−30 degrees of line-of-sight outboard (elevation) travel.

The position sensor 40 may comprise a capacitive resolver such as that described in U.S. patent application Ser.

No. 09/310,365, entitled CAPACITIVE RESOLVER, which is assigned to the assignee hereof, filed on May 12, 1999 and incorporated herein by reference. The azimuth motor 60, which includes the azimuth motor stator 62 and azimuth motor rotor 64, may preferably be a two-phase direct-drive constant reluctance motor. The beam-steering mirror 70 may preferably be a beryllium heliostat mirror with an electroless nickel coating and spectrally specific coatings. The beam-steering mirror 70 is preferably flat to within one-fortieth of the wavelength (RMS) of the optical beam over the operating temperature and, preferably, has a surface roughness of no greater than 20 angstroms.

Electrical and/or optical connection between components mounted on the azimuth shaft 22 and control circuitry within the satellite is provided via a cablewrap arrangement. The cablewrap is preferably of the type described in TRW Docket No. 11-1037, entitled "LOW-TORQUE ELECTRO-OPTICAL LAMINATED CABLE AND CABLEWRAP," which is assigned to the assignee hereof, filed on an even date herewith and incorporated herein by reference. The cablewrap is contained within a cablewrap cavity 80. An upper cablewrap plate 82 is connected to the azimuth shaft 22 and rotates with respect to the azimuth drive housing 20. A lower cablewrap plate 84 is connected to and stationary with respect to the azimuth drive housing 20.

A lubrication reservoir 90 is included for providing lubrication to the duplex bearings 50. The lubrication reservoir 90 is attached to the lower cablewrap plate 84 by a reservoir retainer 92. The reservoir retainer 92 holds the lubrication reservoir 90 stationary with respect to the azimuth drive housing 20.

A motor cover 94 connected to the lower end of the azimuth drive housing 20 protects the azimuth motor stator 62 and azimuth motor rotor 64 from debris and provides electromagnetic shielding. The azimuth drive housing 20 includes a mounting flange 96 for mounting the azimuth drive housing 20 to a satellite.

Figure 2:
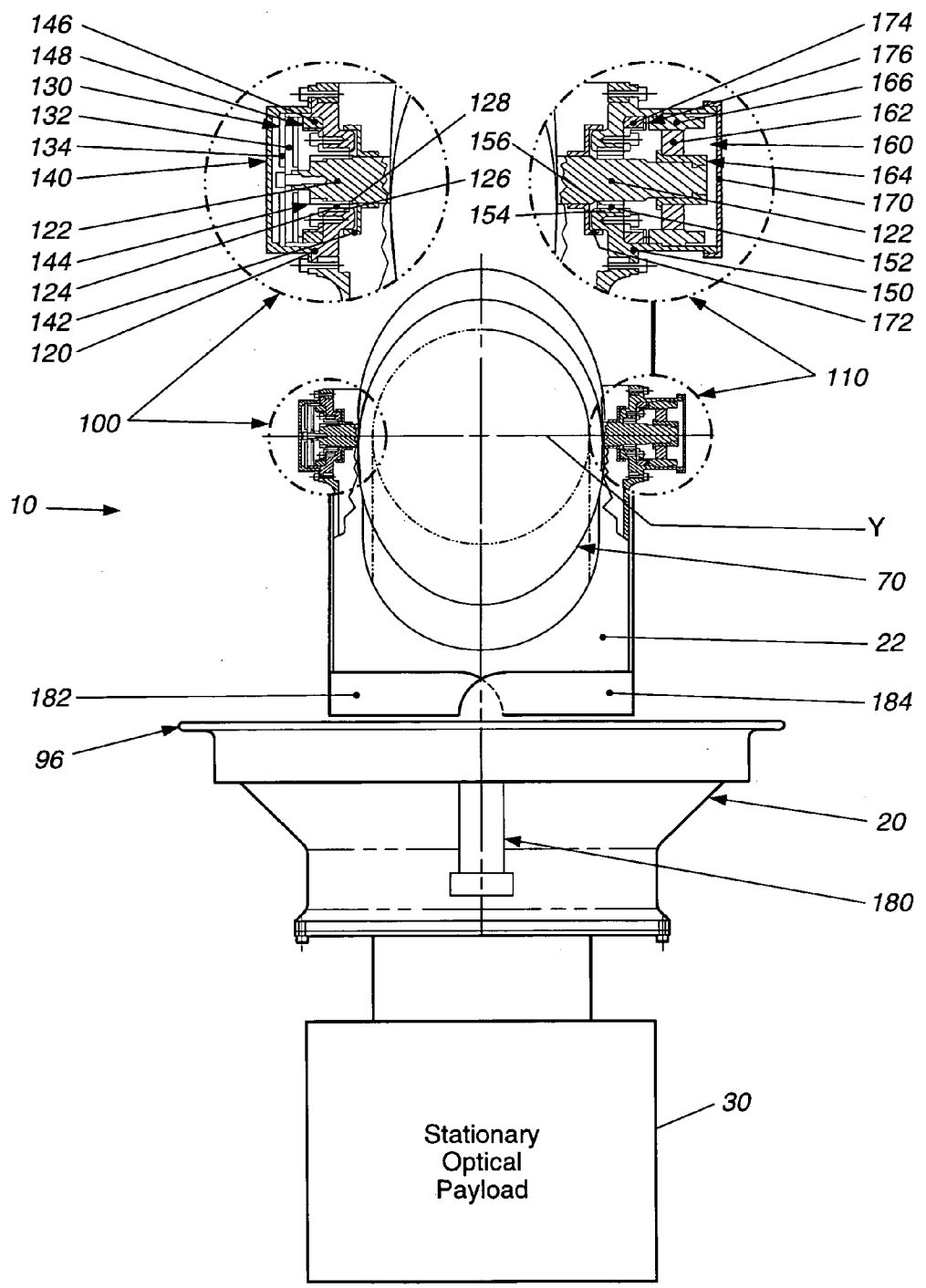
FIG. 2 illustrates a partial side cross sectional view of the OISL gimbal according to a preferred embodiment of the present invention.

FIG. 2 illustrates in greater detail the elements used to rotatably connect the beam-steering mirror 70 to the azimuth shaft 22 and to drive the beam-steering mirror 70 about the elevation axis Y. The beam-steering mirror 70 is rotatably connected to the azimuth shaft 22 by an elevation sensor module 100 on one side and an elevation drive module 110 (within smaller dashed circles) on the other side. FIG. 2 provides an enlarged view of the elevation sensor module 100 and elevation drive module 110 (within larger dashed circles).

The elevation sensor module 100 includes an elevation sensor housing 120 that is bolted to the azimuth shaft 22. An elevation shaft 122 rotates about the elevation axis Y within the elevation sensor housing 120 upon an elevation bearing pair 124. The elevation bearing pair 124 includes outer races 126 that are rigidly connected to the elevation sensor housing 120 and inner races 128 that are rigidly connected to the elevation shaft 122. The beam-steering mirror 70 is mounted on the elevation shaft 122.

The elevation position of the beam-steering mirror 70 is detected by an elevation position sensor 130. The elevation position sensor 130 includes a sensor rotor 132 that is attached to the end of the elevation shaft 122 and a sensor stator 134 that is stationary with respect to the azimuth shaft 22. The elevation position sensor 130 may comprise a capacitive resolver such as that described in U.S. patent application Ser. No. 09/310,365, entitled CAPACITIVE RESOLVER, which is assigned to the assignee hereof, filed on May 12, 1999 and incorporated herein by reference.

A sensor cover 140 covers the elevation position sensor 130. A labyrinth seal 142 forms a seal with the elevation shaft 122 and the elevation sensor housing 120. A spanner nut 144 holds the elevation shaft 122 within the elevation sensor housing 120. A lubrication reservoir 146 is included for providing lubrication to the duplex bearing 124. The lubrication reservoir 146 is attached to the elevation sensor housing 120 by a reservoir retainer 148. The reservoir retainer 148 holds the lubrication reservoir 146 stationary with respect to the elevation sensor housing 120.

The elevation drive module 110 includes an elevation drive housing 150 that is bolted to the azimuth shaft 22. The elevation shaft 122 rotates about the elevation axis Y within the elevation drive housing 150 upon an elevation bearing pair 152. The elevation bearing pair 152 includes outer races 154 that are rigidly connected to the elevation drive housing 150 and inner races 156 that are rigidly connected to the elevation shaft 122. As stated above, the beam-steering mirror 70 is mounted on the elevation shaft 122.

The rotation of the elevation shaft 122 and beam-steering mirror 70 is driven by an elevation motor 160. The elevation motor 160 includes an elevation motor rotor 162 that is attached to the elevation shaft 122 by a motor rotor carrier 164 and an elevation motor stator 166 that is rigidly connected to the elevation drive housing 150. The elevation motor 160 preferably may comprise a direct-drive constant-reluctance motor.

An elevation motor cover 170 covers the elevation motor 160. A labyrinth seal 172 forms a seal with the elevation shaft 122 and the elevation drive housing 150. A lubrication reservoir 174 is included for providing lubrication to the bearing 152. The lubrication reservoir 174 is attached to the elevation drive housing 150 by a reservoir retainer 176. The reservoir retainer 176 holds the lubrication reservoir 174 stationary with respect to the elevation drive housing 150.

Electrical connections between control circuitry within the satellite and the elevation position sensor 130 within the elevation sensor 100 pass through a stationary external wiring passage 180, into the cablewrap cavity 80 (shown in FIG. 1), and then through external sensor wiring 182. Similarly, electrical connections between control circuitry within the satellite and the elevation motor 160 within the elevation drive module 110 pass through the stationary external wiring passage 180, into the cablewrap cavity 80 (shown in FIG. 1), and then through external motor wiring 184.

The OISL gimbal 10 has a relatively small volumetric displacement. For example, the azimuth shaft 22 may be approximately 7.5 inches in diameter and 10 inches from top to bottom. The azimuth shaft 22 provides a clear aperture of approximately 6.5 inches in diameter. The azimuth assembly housing 20 may have an outer diameter of approximately 14 inches and may extend 5.0 inches below the mounting flange 96. When assembled, the OISL gimbal 10 measures approximately 10 inches from the base of the azimuth assembly housing 20 (at the azimuth motor cover 94) to the top of the azimuth shaft 22.

Figure 3:
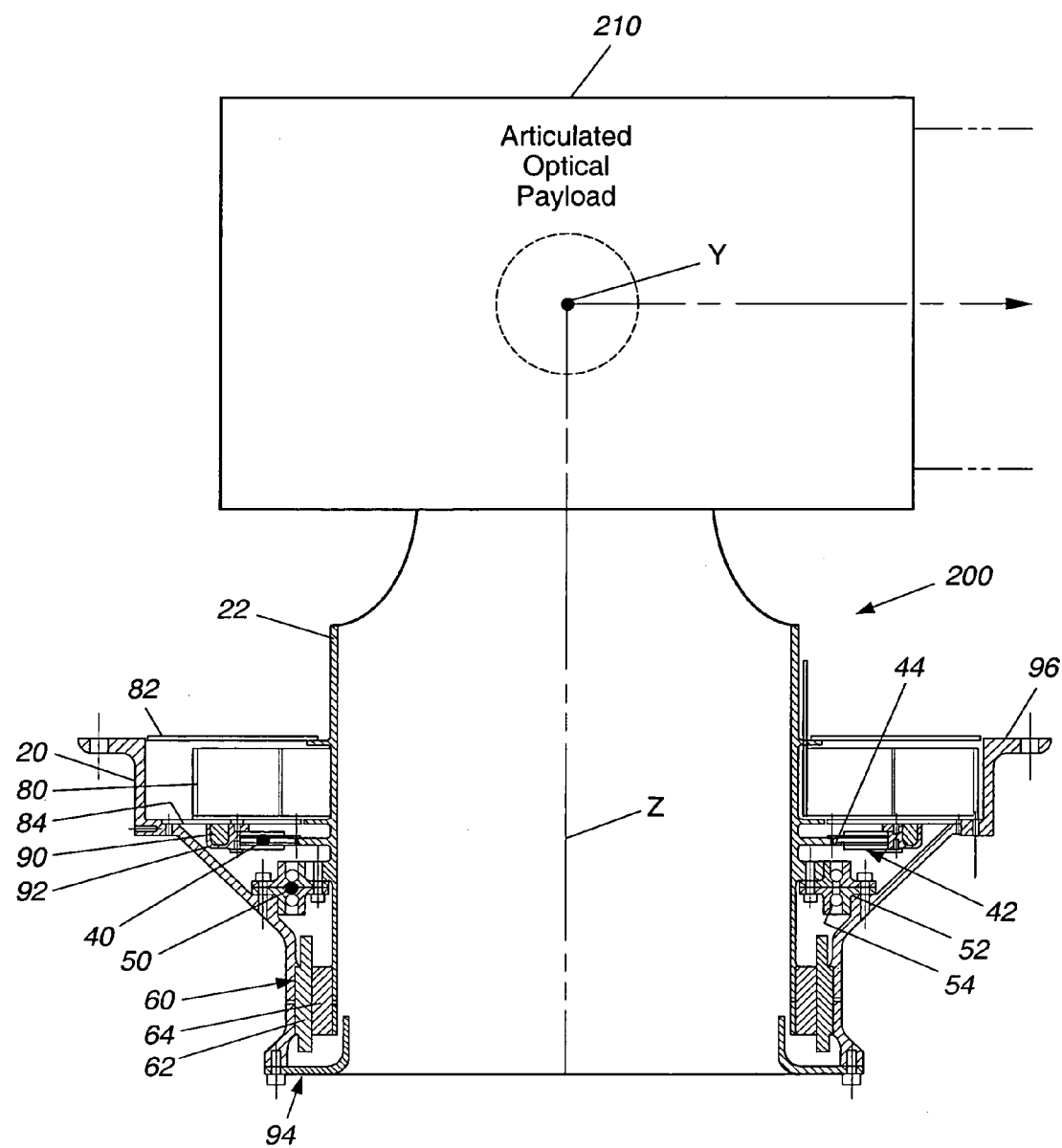
FIG. 3 illustrates a partial side cross sectional view of the OISL gimbal according to a preferred embodiment of the present invention.

FIG. 3 illustrates an alternative embodiment of the present invention. The OISL gimbal 200 illustrated in FIG. 3 is similar to the OISL gimbal 10 of FIGS. 1 and 2, however, an articulated optical payload 210 has been substituted for the beam-steering mirror 70 of FIGS. 1 and 2. The articulated optical payload 210 may comprise, for example, an optical beam transmitter and/or receiver. The articulated optical payload 210 might also comprise one or more mirrors and/or beam splitters.

With the exception the substitution of the articulated optical payload 210 for the beam-steering mirror 70, the OISL gimbal 200 of FIG. 3 includes all of the components (arranged in the same manner) described with respect to FIG. 1 for rotating the azimuth shaft 22 about the azimuth axis Z. For consistency, the components have been numbered as in FIG. 1. Additionally, although not illustrated separately, the OISL gimbal 200 of FIG. 3 may include all of the components (arranged in the same manner) described with respect to FIG. 2 for rotating the articulated optical payload 210 about the elevation axis Y.

While particular elements, embodiments and applications of the present invention have been shown and described, it is understood that the invention is not limited thereto since modifications may be made by those skilled in the art, particularly in light of the foregoing teaching. For example, although the preferred OISL gimbal is described for use on board a satellite, the present invention is not limited to such use. It is therefore contemplated by the appended claims to cover such modifications and incorporate those features that come within the spirit and scope of the invention.

What is claimed is:

1. An apparatus for directing a beam-steering mirror in an optical communications system comprising:
   an azimuth drive housing;
   a substantially cylindrical azimuth shaft connected to said azimuth drive housing defining an internal aperture, said azimuth shaft being rotatable about a first axis with respect to said azimuth drive housing;
   a beam-steering mirror connected to said azimuth shaft, said beam-steering mirror being rotatable about a second axis with respect to said azimuth shaft;
   an azimuth motor operable to drive the rotation of the azimuth shaft about said first axis, said azimuth motor comprising a motor rotor connected to and encircling said azimuth shaft and a motor stator connected to said azimuth drive housing; and
   an azimuth position sensor comprising a sensor rotor connected to and encircling said azimuth shaft and a sensor stator connected to said azimuth drive housing,
   wherein said azimuth position sensor comprises a capacitive sensor and wherein said capacitive sensor includes a disk mounted co-axially to said azimuth shaft, wherein said disk includes a central aperture through which optical signals pass.

2. An apparatus for directing an optical payload in an optical communications system comprising:
   an azimuth drive housing;
   a substantially cylindrical azimuth shaft connected to said azimuth drive housing, said azimuth shaft being rotatable about a first axis with respect to said azimuth drive housing;
   an optical payload connected to said azimuth shaft, said optical payload being rotatable about a second axis with respect to said azimuth shaft;
   an azimuth motor operable to drive the rotation of the azimuth shaft about said first axis, said azimuth motor comprising a motor rotor connected to and encircling said azimuth shaft and a motor stator connected to said azimuth drive housing; and
   an azimuth position sensor comprising a sensor rotor connected to and encircling said azimuth shaft and a sensor stator connected to said azimuth drive housing,
   wherein said azimuth position senor comprises a capacitive sensor and wherein said capacitive sensor includes a disk mourned co-axially to said azimuth shaft, wherein said disk includes a central aperture through which optical signals pass.

3. An apparatus comprising:
   an optical payload mounted on a two-axis gimbal;
   a first rotating means for rotating said gimbal about a first axis;
   a second rotating means for rotating said gimbal about a second axis;
   a first sensor means for sensing the rotational position of the gimbal about said first axis; and
   a second sensor means for sensing the rotational position of the gimbal about said second axis,
   wherein said first sensor means includes a position sensor comprising a capacitive sensor and wherein said capacitive sensor includes a disk mounted co-axially to said first axis,
   wherein said disk includes a central aperture through which optical signals pass.

4. An apparatus according to claim 3, wherein said first rotating means comprises a direct-drive, constant reluctance motor.

5. An apparatus according to claim 3, wherein said first sensor means comprises a capacitive sensor.

6. An apparatus according to claim 3, wherein said second rotating means comprises a direct-drive, constant reluctance motor.

7. An apparatus according to claim 3, further comprising connector means for providing an electrical connection to the first or second rotation means.

8. An apparatus according to claim 3, wherein said optical payload comprises a beam-steering mirror.

* * * * *